(12) United States Patent  (10) Patent No.: US 7,523,965 B2
Masarwa  (45) Date of Patent: Apr. 28, 2009

(54) IRRIGATION PIPE COUPLING

(75) Inventor: Abed Masarwa, Taybi (IL)

(73) Assignee: Netafim, Ltd., Tel-Aviv (IL)

( * ) Notice: Subject to any disclaimer, the term of this patent is extended or adjusted under 35 U.S.C. 154(b) by 48 days.

(21) Appl. No.: 11/758,414

(22) Filed: Jun. 5, 2007

(65) Prior Publication Data
US 2008/0303273 A1  Dec. 11, 2008

(51) Int. Cl.
*F16L 5/00* (2006.01)
(52) U.S. Cl. .................. 285/139.2; 285/139.3; 285/206; 285/200; 251/150; 239/547
(58) Field of Classification Search .............. 285/139.2, 285/139.1, 139.3, 141.1, 136.1, 206, 208, 285/189, 200; 251/150, 146; 138/119; 239/542, 239/547
See application file for complete search history.

(56) References Cited

U.S. PATENT DOCUMENTS

| 1,472,794 | A | * | 11/1923 | Foley | 285/18 |
| 2,435,466 | A | * | 2/1948 | Talbott | 425/53 |
| 3,181,899 | A | * | 5/1965 | McKnight, Jr. | 285/139.2 |
| 4,018,459 | A | * | 4/1977 | Mominee et al. | 285/5 |
| 4,234,218 | A | * | 11/1980 | Rogers | 285/149.1 |
| 4,887,851 | A | * | 12/1989 | Rush et al. | 285/139.1 |
| 5,104,273 | A | * | 4/1992 | Clark | 411/85 |
| 6,089,615 | A | * | 7/2000 | Jappinen | 285/21.2 |
| 7,121,589 | B2 | * | 10/2006 | Hawkinson et al. | 285/139.2 |
| 2005/0194469 | A1 | | 9/2005 | Masarwa et al. | |
| 2006/0103131 | A1 | | 5/2006 | Masarwa et al. | |

FOREIGN PATENT DOCUMENTS

WO  WO 2005/084418  9/2005

OTHER PUBLICATIONS

International Search Report No. PCT/IL2008/000679, dated Jul. 31, 2008.

* cited by examiner

*Primary Examiner*—David E Bochna
(74) *Attorney, Agent, or Firm*—Womble Carlyle

(57) ABSTRACT

A coupling is formed from inner and outer members. The inner member is attached to a pipe wall and is formed with a bulge. The outer member is retained by the inner member and is formed with a clamp that surrounds the bulge.

17 Claims, 2 Drawing Sheets

IRRIGATION PIPE COUPLING

BACKGROUND

The present disclosure relates to a coupling for use in an irrigation system.

Such a coupling may be used between an irrigation pipe and a main distribution pipe from which it branches off.

US Patent Application No. 20070074776, the disclosure of which is incorporated herein by reference, describes that the walls of a pipe under internal hydrostatic pressure experience, under ideal conditions, twice the stress in the circumferential direction as they do in the longitudinal direction.

In some cases, this should be taken into account in the coupling.

SUMMARY

The following embodiment and aspects thereof are described and illustrated in conjunction with systems, tools and methods which are meant to be exemplary and illustrative, not limiting in scope.

In an embodiment is disclosed a coupling between a lay flat irrigation pipe and an irrigation element, the coupling comprises an inner member attached to a wall of the pipe and an outer member, the inner member comprises a bulge and a bore, the bore is formed about an axis in the inner member, and the bulge at least partially surrounds the axis, the outer member comprises a clamp and a shank, the shank is retained in the bore of the inner member, and the clamp at least partially surrounds a base of the shank, wherein at least a portion of the bulge is located between the shank and the clamp.

Optionally, an imaginary plane perpendicular to the axis passes through the bulge and the clamp.

Typically, when the pipe is not under internal fluid pressure the imaginary plane passes through a gap between the bulge and the clamp.

Preferably, when the pipe is under a given internal fluid pressure at least a portion of the bulge abuts the clamp.

Optionally, the bulge projects a distance smaller than 5 mm out of the pipe.

Further optionally, the shank is threadingly retained in the bore.

If desired, the inner member is bonded to the wall and formed from polyolefin material.

In addition to the exemplary aspects and embodiment described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The disclosure, however, both as to organization and method of operation, together with objects, features, and advantages thereof, may best be understood by reference to the following detailed description when read with the accompanying figures, in which.

Figure 1:
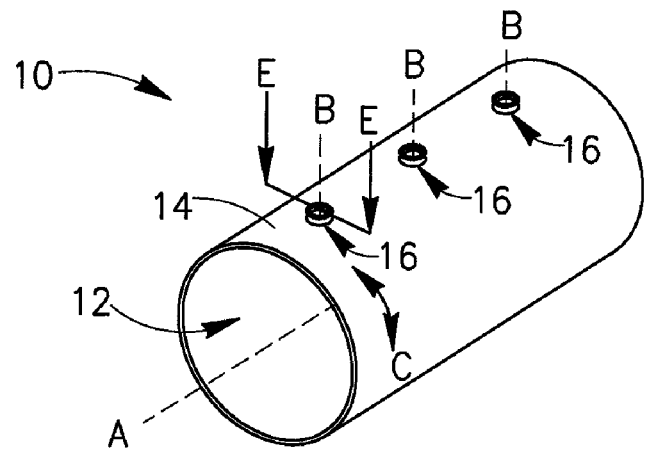
FIG. 1 shows a perspective view of a pipe incorporating couplings in accordance with the present disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Attention is first drawn to FIG. 1 showing a pipe 10 having an axis A which defines a longitudinal direction therealong and a circumferential direction C thereabout. The pipe 10 has an axially extending lumen 12 and a wall 14 that surround the lumen 12. Three couplings 16, extending each along an axis B, are attached at longitudinally spaced apart locations to the wall 14. The pipe 10 is of a lay-flat type which when not in use under internal fluid pressure and/or when rolled on a reel may have a shape of a generally flat strip (not shown). If the pipe 10 has a cylindrical shape under internal fluid pressure (as shown) then the axis B radially intersects the longitudinal axis A. It is noted that the pipe 10 may have a shape other than cylindrical under internal fluid pressure.

An out and an in direction of the axis B is defined respectively out of and into the pipe 10. It should be noted that the directional terms appearing throughout the specification and claims are for illustrative purposes only, and are not intended to limit the scope of the appended claims. The terms "above", "up", "out" (and derivatives thereof) define similar directions; and the terms "down", "below", "lower", "in" (and derivatives thereof) define similar directions. In addition it is noted that each member of the coupling 16, even when shown by itself, will be described herein in its respective orientation in the coupling 16 and therefore in relation to the axis B.

Figure 2:
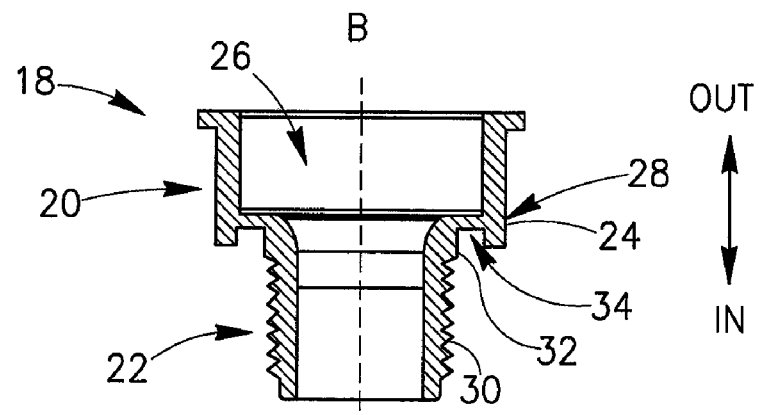
FIG. 2 shows a cross sectional view of an outer member of the coupling taken in the plane E-E in FIG. 1.

Attention is drawn to FIG. 2. An outer member 18 of the coupling 16 has unitary one-piece construction and comprises a body 20, a shank 22, a clamp 24 and a cavity 26. The cavity 26 extends along the axis B through the outer member 18 and opens out to an outer end and an inner end of the outer member 18. The body 20 extends along the axis B from the outer end to an inner body end 28. The shank 22 extends inwardly from the inner body end 28 and a shank thread 30 is formed on a peripheral face of the shank 22. The clamp 24 extends inwardly from the inner body end 28 and surrounds a base 32 of the shank 22. An inward open annular groove 34 is formed between the clamp 24 and the base 32. The outer member 18 is adapted to connect at an outer portion thereof to an irrigation element (not shown). The irrigation element may be any element used in irrigation such as a drip irrigation pipe, an irrigation fitting, a sprinkler, a valve or a pressure regulator.

Figure 3:
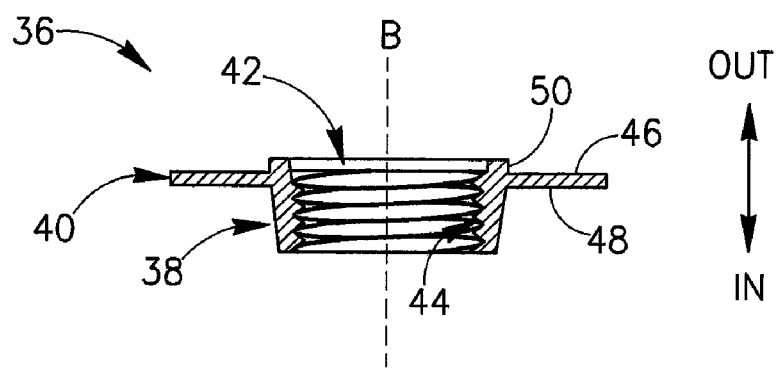
FIG. 3 shows a cross sectional view of an inner member of the coupling taken in the plane E-E in FIG. 1.

Attention is drawn to FIG. 3. An inner member 36 of the coupling 16 has unitary one-piece construction and comprises a core 38, an annular wing 40 and a bore 42. The core 38 extends along the axis B and the bore 42 extends axially therethrough and opens out to an outer end and an inner end of the inner member 36. A bore thread 44 is formed on a peripheral face of the bore 42. The wing 40 extends away from an upper potion of the core 38 in a direction away from the axis B and has an outer surface 46 and an inner surface 48. The outer surface 46 faces outwardly and the inner surface 48 faces inwardly. A bulge 50 of the core 38, which is located about the axis B, projects axially out and above the outer surface 46 of the wing 40.

Figure 4:
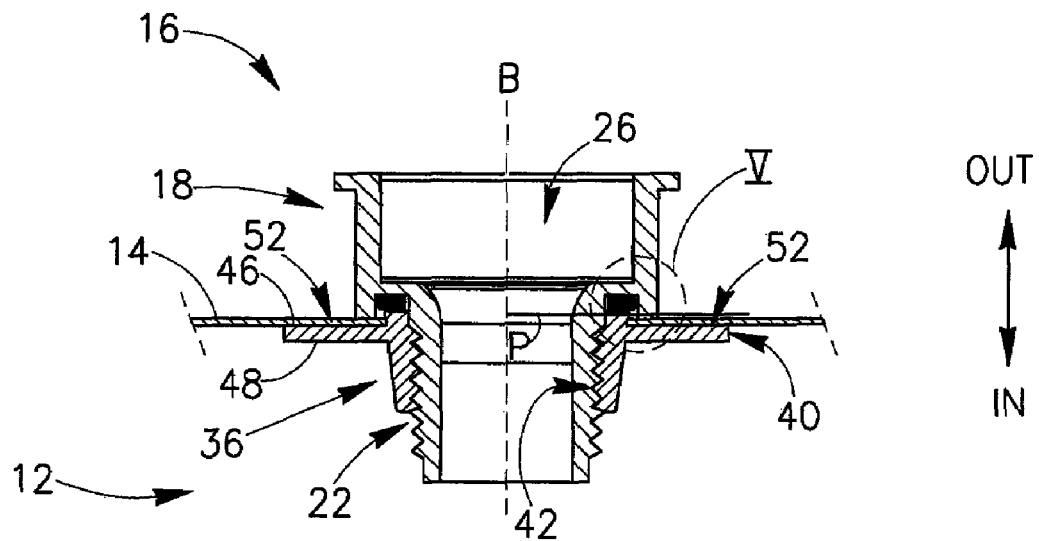
FIG. 4 shows a partial cross sectional view of the pipe taken through the coupling in the plane E-E in FIG. 1.
Figure 5:
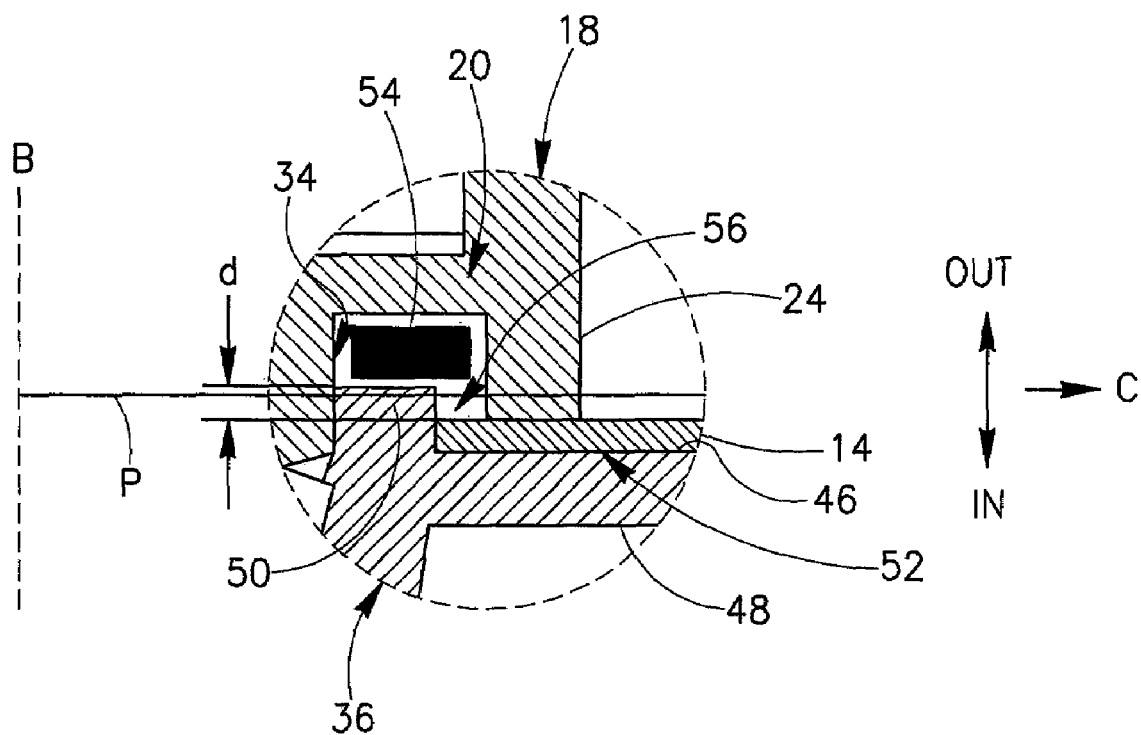
FIG. 5 shows a section of FIG. 4.

Attention is now drawn to FIGS. 4 and 5 that show, inter alia, a partial cross section of the wall 14 of the pipe 10 along the circumferential direction C. The wall 14 and the outer surface 46 of the wing 40 are attached at an attachment region 52 and a portion the bulge 50 projects slightly axially above the wall 14 a distance d. Optionally, the distance d is between 0.5 and 5 mm.

In an assembled position of the coupling 16 (as shown), the shank 22 is releasably threadingly retained in the bore 42 and the slight projection of the bulge 50 above the wall 14 is sufficient to locate at least a portion of the bulge 50 in the groove 34. In the assembled position, the cavity 26 provides fluid communication between the lumen 12 of the pipe and the exterior of the pipe 10. In addition, a seal 54 of the coupling 16 is located in the groove 34 axially between the body 20 of the outer member 18 and the bulge 50 of the inner member 36. It is noted that in the assembled position, an imaginary plane P perpendicular to the axis B passes through the bulge 50 and the clamp 24.

When not in use, the outer members 18 can be easily removed from the pipe 10 thereby leaving the pipe 10 with only inner members 36. It is noted that the low profiled projection at the bulge 50 of each inner member 36 out of the pipe 10, enables the pipe 10 when not in use to be rolled in rather tight reels suitable for packaging, transportation, storage and sale, etc.

Under internal fluid pressure the pipe 10 may experience stresses which, in the lay flat pipe, may cause deformations in the wall 14 of the pipe 10. These stresses, which are typically larger in the circumferential direction C, may deform the wall 14 to a larger extent in the circumferential direction C. The deformation may be transformed from the wall 14 to the coupling 16 that is attached thereto and thereby ruin or harm, inter alia, the retention of the shank 22 in the bore 42. In the example descried herein, wherein the retention of the shank 22 in the bore 42 is provided by the shank and bore threads 30, 44, the deformation of the bore 42 which may ruin or harm the retention is one that releases the shank 22 from being threaded in the bore 42 or causes spaces between the shank and bore threads 30, 44 through which fluid may leak from the lumen 12.

The inner member 36 is optionally formed from polyolefin material which is relatively cheap and resistant to damage caused by nutrients and other materials carried by irrigation water. However, polyolefin material is a relatively soft or weak material which may easily deform under pressure or a combination of pressure and temperature.

Attention is specifically drawn to FIG. 5. Under the internal fluid pressure in the pipe 10 the inner member 36 which is attached to the wall 14 at the outer surface 46 may be urged to deform therewith in a direction away from the axis B. If this occurs, the bulge 50 of the inner member 36 will abut and bear against the clamp 24 of the outer member 18 (not shown). Optionally, the bulge 50 will first abut and bear against the clamp 24 in the circumferential direction C.

The imaginary plane P may pass through a gap 56 that is optionally formed between the bulge 50 and the clamp 24. The gap 56 helps share the stress that is formed in the wall 14 of the pipe 10 between the attachment region 52 and the bulge 50 and clamp 24. Under internal fluid pressure in the pipe 10, the stress formed in the wall 14 first deforms the wall 14 and the inner member 36 in a direction away from the axis B until the gap 56 diminishes and the bulge 50 and clamp 24 abut. Any additional stress that may exist in the wall 14 may urge the bulge 50 to bear against the clamp 24 and thereby share the stress between the attachment region 52 and the clamp 24 and bulge 50.

It is noted that the coupling 16 may be attached to the wall 14 at other surfaces. For example, the inner surface 48 of the wing 40 may be attached to the wall 14 of the pipe 10 (not shown). In this case, the bulge 50 of the inner member 36 should at least project above the outer surface 46 of the wing 40 and into the groove 34. In addition it is noted that the coupling 16 may be attached at the attachment region 52 to the wall 14 in various ways. For example, the attachment may be due to pressure being axially imposed upon the wall 14 and inner member 36. Preferably at the attachment region 52, the inner member 36 is bonded to the wall 14 of the pipe 10 or fused to the wall 14 of the pipe 10 by at least portions of the inner member 36 and/or wall 14 that at an instance immediately prior to attachment were in a melted form.

Although the present embodiment has been described to a certain degree of particularity, it should be understood that various alterations and modifications could be made without departing from the scope of the disclosure as hereinafter claimed.

What is claimed is:

1. An irrigation pipe coupling between a lay flat irrigation pipe and an irrigation element, the coupling comprises an inner member attached to a wall of the pipe and an outer member,
    the inner member comprises a bulge and a bore, the bore is formed about an axis in the inner member, and the bulge at least partially surrounds the axis,
    the outer member comprises a clamp and a shank, the shank is retained in the bore of the inner member, and the clamp at least partially surrounds a base of the shank, wherein
    at least a portion of the bulge is located between the shank and the clamp.

2. The irrigation pipe coupling according to claim 1, wherein an imaginary plane perpendicular to the axis passes through the bulge and the clamp.

3. The irrigation pipe coupling according to claim 2, wherein when the pipe is not under internal fluid pressure the imaginary plane passes through a gap between the bulge and the clamp.

4. The irrigation pipe coupling according to claim 1, wherein when the pipe is under a given internal fluid pressure at least a portion of the bulge abuts the clamp.

5. The irrigation pipe coupling according to claim 1, wherein the bulge projects a distance smaller than 5 mm out of the pipe.

6. The irrigation pipe coupling according to claim 1, wherein the shank is threadingly retained in the bore.

7. The irrigation pipe coupling according to claim 1, wherein the inner member is bonded to the wall.

8. The irrigation pipe coupling according to claim 1, wherein the inner member is formed from polyolefin material.

9. An irrigation pipe coupling for connecting to a lay flat irrigation pipe, comprising:
    an inner member having unitary one-piece construction and comprising a bulge and a bore, the bore being formed about an axis in the inner member, and the bulge at least partially surrounding the axis; and
    an outer member having unitary one-piece construction and comprising a clamp and a shank, the clamp at least partially surrounding a base of the shank; wherein:
    the coupling is adjustable between:
        a disassembled position in which the inner and outer members are separated from each other, and
        an assembled position in which the shank of the outer member is retained in the bore of the inner member and at least a portion of the inner member's bulge is located between the shank and the clamp.

10. An irrigation pipe coupling in combination with a lay flat irrigation pipe, the irrigation pipe coupling comprising:

an inner member comprising a bulge and a bore, the bore being formed about an axis in the inner member, and the bulge at least partially surrounding the axis; and an outer member comprising a clamp and a shank, the clamp at least partially surrounding a base of the shank; wherein:

the coupling is adjustable between:

a disassembled position in which the inner and outer members are separated from each other, and an assembled position in which the shank of the outer member is retained in the bore of the inner member and at least a portion of the inner member's bulge is located between the shank and the clamp; and wherein the coupling is in the assembled position and the inner member is attached to a wall of the pipe.

11. The irrigation pipe coupling according to claim 10, wherein an imaginary plane perpendicular to the axis passes through the bulge and the clamp.

12. The irrigation pipe coupling according to claim 11, wherein when the pipe is not under internal fluid pressure the imaginary plane passes through a gap between the bulge and the clamp.

13. The irrigation pipe coupling according to claim 10, wherein when the pipe is under a given internal fluid pressure at least a portion of the bulge abuts the clamp.

14. The irrigation pipe coupling according to claim 10, wherein the bulge projects a distance smaller than 5 mm out of the pipe.

15. The irrigation pipe coupling according to claim 10, wherein the shank is threadingly retained in the bore.

16. The irrigation pipe coupling according to claim 10, wherein the inner member is bonded to the wall.

17. The irrigation pipe coupling according to claim 10, wherein the inner member is formed from polyolefin material.

* * * * *